United States Patent [19]
Baney

[11] Patent Number: 6,101,026
[45] Date of Patent: Aug. 8, 2000

[54] REVERSIBLE AMPLIFIER FOR OPTICAL NETWORKS

[75] Inventor: Douglas M. Baney, Los Altos, Calif.

[73] Assignee: Agilent Technologies, Inc., Palo Alto, Calif.

[21] Appl. No.: 09/013,868

[22] Filed: Jan. 27, 1998

[51] Int. Cl.⁷ .................. H01S 3/00; G02B 27/28
[52] U.S. Cl. ............ 359/341; 359/282; 359/484; 385/6
[58] Field of Search .................. 359/341, 484, 359/495, 497, 282, 900; 385/6, 11

[56] References Cited

U.S. PATENT DOCUMENTS

| 4,650,289 | 3/1987 | Kuwahara | 350/375 |
| 5,815,308 | 9/1998 | Kim et al. | 359/341 |
| 5,912,766 | 6/1999 | Pattie | 359/484 |

FOREIGN PATENT DOCUMENTS

| 1-274111 | 1/1990 | Japan . |
| 3-125125 | 5/1991 | Japan . |
| 4-264227 | 9/1992 | Japan . |

*Primary Examiner*—Mark Hellner

[57] ABSTRACT

A reversible optical isolator and optical amplifier based on the optical isolator. The reversible isolator is constructed from a Faraday rotator having a magnetic field direction that is determined by a control signal applied thereto. The Faraday rotator is sandwiched between first and second polarization filters. The polarization filters may be constructed from polarization splitters in series with half-wave plates. The allowed direction of propagation of an optical signal through the reversible optical amplifier is determined by the magnetic field direction in the Faraday rotator. An optical amplifier according to the present invention includes an optical gain element in series with one or two reversible optical isolators.

4 Claims, 6 Drawing Sheets

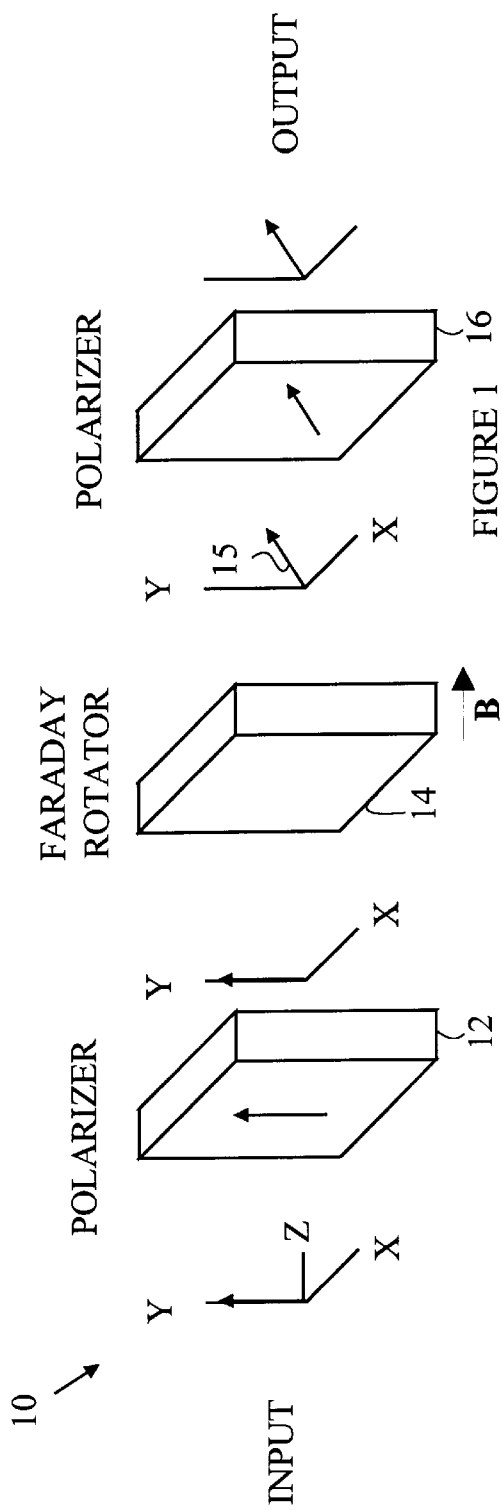
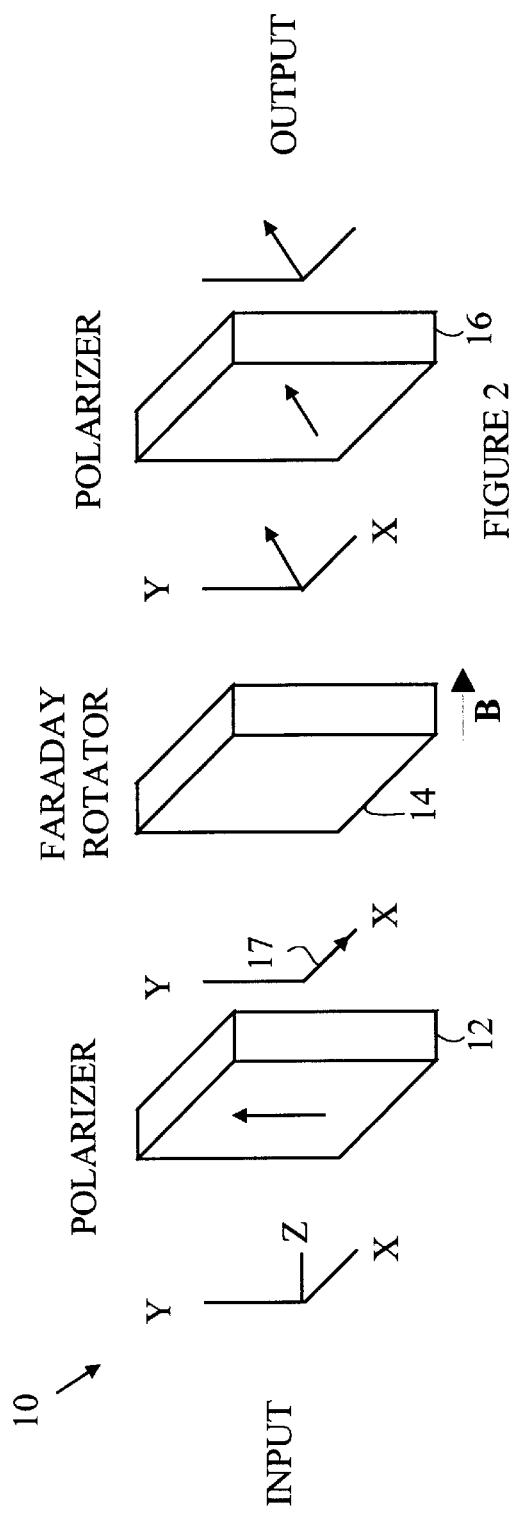

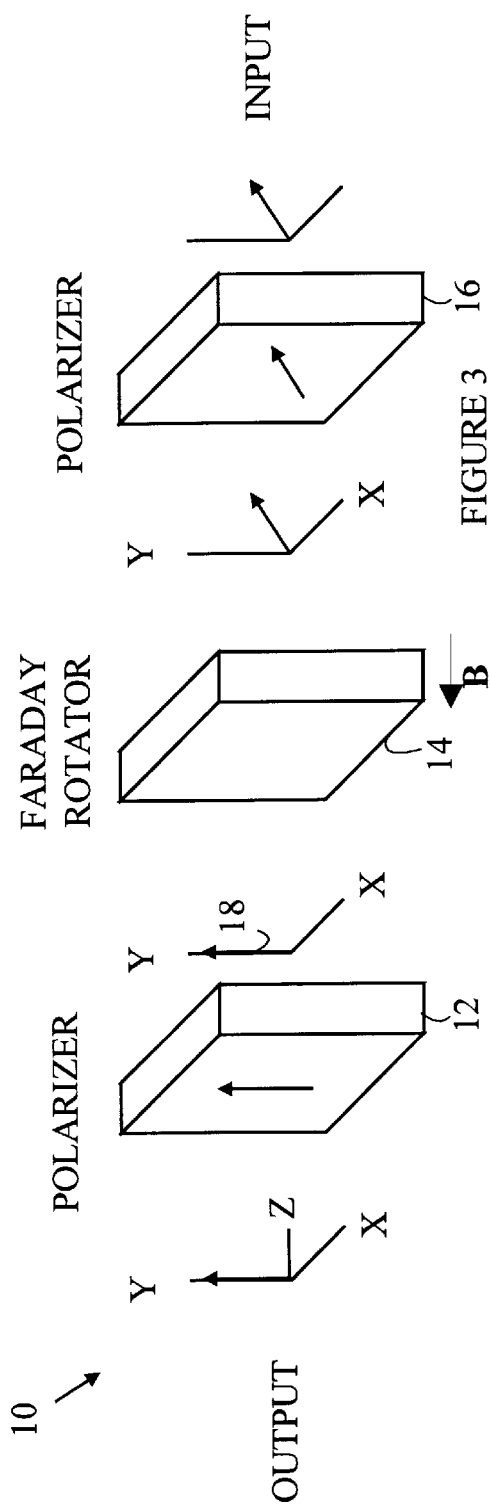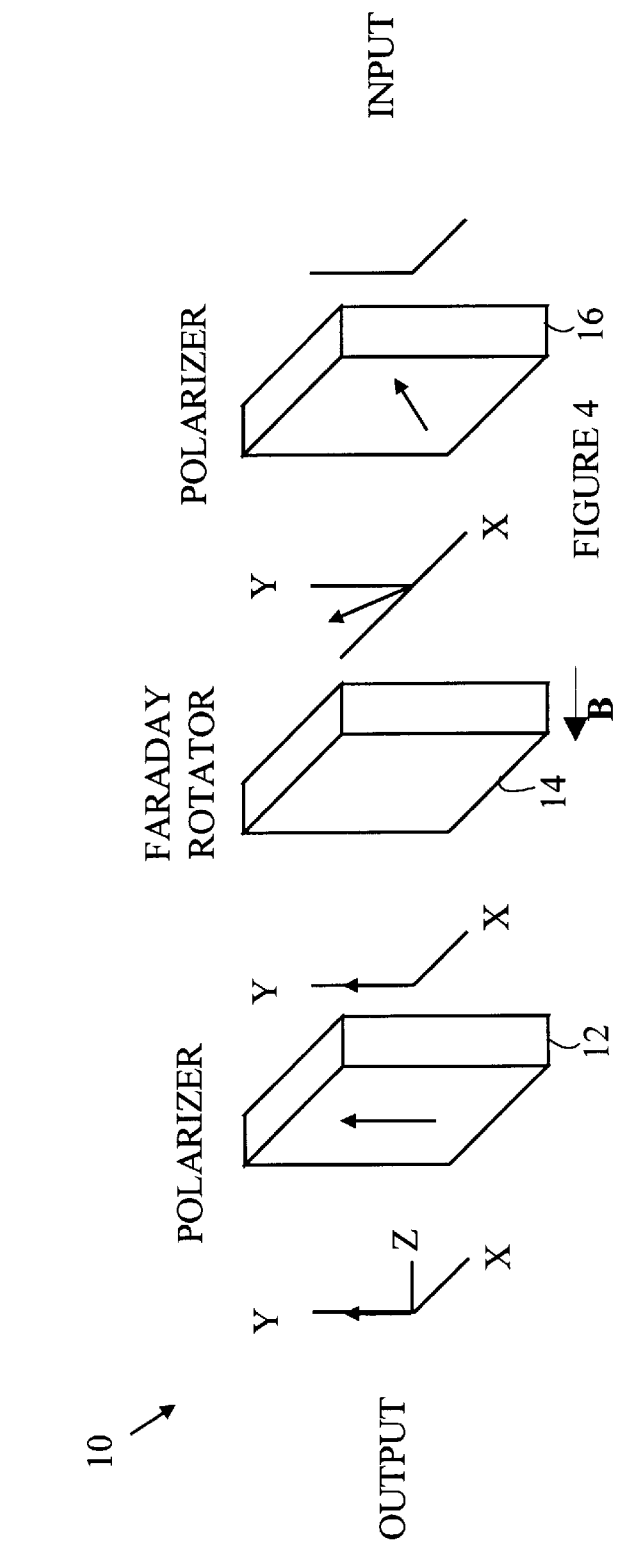

REVERSIBLE AMPLIFIER FOR OPTICAL NETWORKS

FIELD OF THE INVENTION

The present invention relates to data communication systems based on light signals and more particularly, to amplifiers and isolators for operating on light signals in optical networks.

BACKGROUND OF THE INVENTION

Communication networks based on optical fibers are becoming increasingly popular because of their high data transmission capacities and the low cost of the optical fibers. In a typical communication network, a number of users communicate with one another over an optical fiber arranged in a loop by sending signals along the fiber in a predetermined direction. For example, in a telecommunications network each subscriber communicates with a central office over a fiber that is arranged in a ring with the subscriber and central office stations disposed along the ring. If the fiber is broken, communication between one or more of the users and the central office will be interrupted. In principle, these users can still communicate with the central office by sending messages along the uninterrupted portion of the loop. However, this requires that the direction of propagation along the fiber be reversed over a portion of the fiber.

Unfortunately, the fiber ring typically includes components that are unidirectional in nature such as optical amplifiers and isolators. A typical optical amplifier consists of a doped fiber between two optical isolators that prevent light generated in the doped fiber from propagating in the backward direction around the fiber. To reverse the direction of propagation in response to a fiber break, duplicate optical isolators configured to propagate signals in the opposite direction are included in the network. These components are inserted into the fiber in place of the corresponding components by utilizing bypass switches. Such bypass arrangements substantially increase the cost and complexity of the optical network, and hence, it would be advantageous to avoid these bypass arrangements.

Broadly, it is the object of the present invention to provide an improved optical amplifier.

It is another object of the present invention to provide an optical isolator whose direction of light transmission can be reversed by applying a control signal to the isolator without the need to utilize bypass switches and additional isolators.

It is yet another object of the present invention to provide an optical amplifier having a switchable direction of propagation for the amplified light signal.

These and other objects of the present invention will become apparent to those skilled in the art from the following detailed description of the invention and the accompanying drawings.

SUMMARY OF THE INVENTION

The present invention is a reversible optical isolator and an optical amplifier based on the optical isolator. The reversible isolator is constructed from a Faraday rotator having a magnetic field direction that is determined by a control signal applied thereto. The Faraday rotator is sandwiched between first and second polarization filters. In one embodiment of the present invention, the polarization filters are constructed from polarization splitters in series with half-wave plates. The allowed direction of propagation of an optical signal through the reversible optical amplifier is determined by the magnetic field direction in the Faraday rotator. An optical amplifier according to the present invention includes an optical gain element in series with one or two reversible optical isolators.

BRIEF DESCRIPTION OF THE DRAWINGS

FIGS. 1–4 illustrate the propagation of light through the basic elements of an optical isolator 10 having a reversible pass direction.

DETAILED DESCRIPTION OF THE INVENTION

Figure 5:
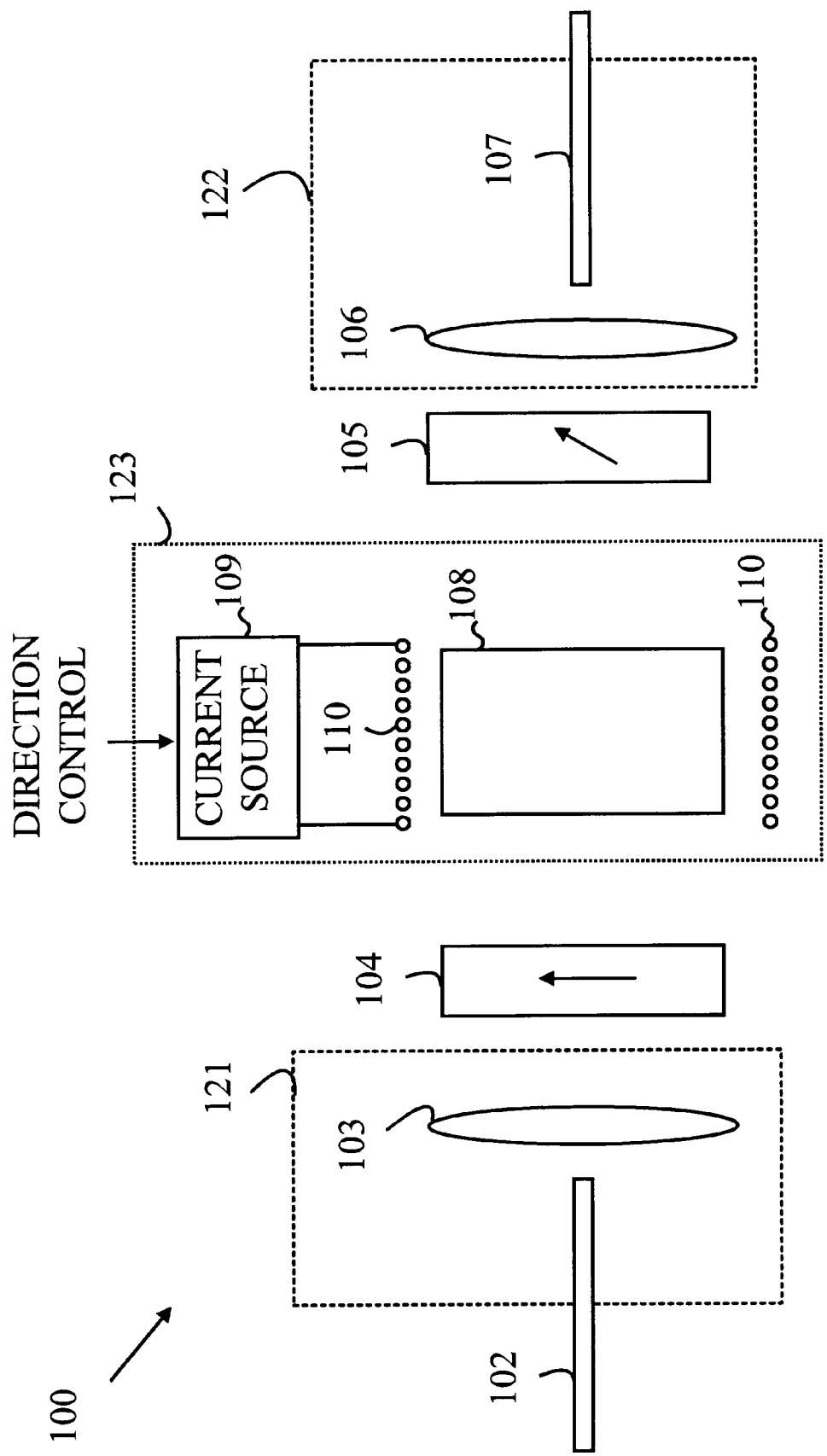
FIG. 5 is a cross-sectional view of a reversible optical isolator according to the present invention.

The present invention provides its advantages by utilizing isolators whose direction of propagation may be altered via a signal applied thereto. For the purposes of this discussion, an optical isolator will be defined to be any device having an input port and an output port in which a light signal entering the input port will exit through the output port; while a light signal entering the output port will be blocked from exiting the input port. A reversible optical isolator is defined to be an optical isolator having first and second ports in which one of the first and second ports is the input port and the other is the output port, the assignment of the input port being determined by a signal applied to the isolator.

The present invention makes use of a Faraday rotator having a magnetic field whose direction is determined by the application of an external signal. A Faraday rotator is an element that is composed of an optically active compound such as yttrium-iron-garnet $Y_3Fe_5O_{12}$ which turns the direction of the polarization vector of the light passing therethrough by an angle of 45°. The direction of rotation is determined by the direction of an applied magnetic field. The direction of rotation of the polarization vector is independent of the direction of travel of the light through the element. By altering the direction of the magnetic field, the rotation of the polarization vector changes from 45° to −45° independent of the direction of travel of the light through device.

The manner in which a reversible optical isolator is constructed from a Faraday rotator having a reversible magnetic field may be more easily understood with reference to FIGS. 1–4 which illustrate the propagation of light through the basic elements of an optical isolator 10 having a reversible pass direction. Isolator 10 is constructed from two polarization filters shown at 12 and 16 and a Faraday rotator 14. For the purposes of this discussion, polarization filter 12 is assumed to pass light which is polarized in a direction parallel to the y-axis, and polarization filter 16 passes light whose polarization is at 45° to the y-axis as indicated by the arrow on polarization filter 16. Light entering the input of isolator 10 is assumed to have at least some intensity along the y-axis. If the light has a polarization vector that is at an angle to the y-axis, the component of the light having a polarization parallel to the x-axis will be removed by polarization filter 12; hence, only the light having a polarization vector parallel to the y-axis needs be considered. This light leaves polarization filter 12 and passes through Faraday rotator 14, which rotates the polarization vector through 45° as shown at 15. The direction of polarization now matches the pass direction of polarization filter 16, and hence, the light exits through the output port.

The case in which light enters the output port is shown in FIG. 2. Polarization filter 16 selects the component of the polarization that is at 45° to the y-axis. Any light having a polarization at right angles to this direction is removed by polarization filter 16. Hence, only light having a polarization selected by polarization filter 16 needs to be considered. The output of polarization filter 16 is rotated through 45° by Faraday rotator 14, since the direction of rotation is independent of the direction of travel of light through the rotator. Hence, the light leaving Faraday rotator 14 will now be parallel to the x-axis as shown at 17. This light will be blocked by polarization filter 12; hence, no light can pass through isolator 10 in the reverse direction.

Now consider the case in which the magnetic field applied to Faraday rotator 14 is reversed. The input and output port designations are also reversed. In this case, Faraday rotator 14 will rotate the polarization of the light passing therethrough by −45° independent of the direction of travel of the light relative to the z-axis of the coordinate system shown in the figures. Referring to FIG. 3, light entering the input end of isolator 10 will first pass through polarization filter 16 which selects the component of the light at 45° to the x-axis. Any polarization component at 90° to this direction is removed by polarization filter 16; hence, only the component at 45° needs to be considered. This component is rotated through −45° by Faraday rotator 14; hence, the light leaving Faraday rotator 14 now has a polarization vector that is vertical as shown at 18. This light will pass through polarization filter 12 and exits isolator 10.

The case in which light enters the output port is shown in FIG. 4. Since only the polarization component of the light parallel to the y-axis will exit polarization filter 12, only this polarization component needs be considered. The light leaving polarization filter 12 enters Faraday rotator 14, which rotates the polarization vector through −45°. Hence, the light entering polarization filter 16 has a polarization vector that is at −45° to the y-axis. This light is blocked by polarization filter 16 since it is at right angles to the pass direction of the polarization filter.

From the above discussion, it is apparent that a reversible optical isolator can be constructed from a Faraday rotator in which the magnetic field applied to the material in the Faraday rotator can be reversed in response to signal that is applied to the isolator. Refer now to FIG. 5, which is a cross-sectional view of a reversible optical isolator 100. Isolator 100 has a first port 121 which includes an optical guide 102 and a collimating/imaging lens 103 for collimating the light received on guide 102 or imaging light from polarization filter 104 back into guide 102. A similar arrangement is utilized for a second port 122, which includes an optical guide 107 and collimating/imaging lens 106. The polarization filter functions discussed above are provided by polarization filters 104 and 105. Polarization filter 104 has a pass orientation that differs from that of polarization filter 105 by 45°. A Faraday rotator 123 rotates the polarization angle of the light that passes between polarization filters 104 and 105 by ±45° depending on the direction of the magnetic field. The direction of the magnetic field is determined by the current passing through coil 110, which generates a magnetic field having a component that is parallel to the direction of travel of the light between filters 104 and 105. The current is provided by current source 109, which sets the direction of the current in response to direction control signal. The direction control signal may be electrical or optical. Other embodiments in which the Faraday rotator utilizes a latching material may also be employed in the present invention. In such embodiments a current pulse sets the direction of magnetization. The direction remains the same until another current pulse is applied. Similarly, a permanent magnet together with a device on flipping the direction of the magnet in response to a control signal could also be utilized.

Figure 6:
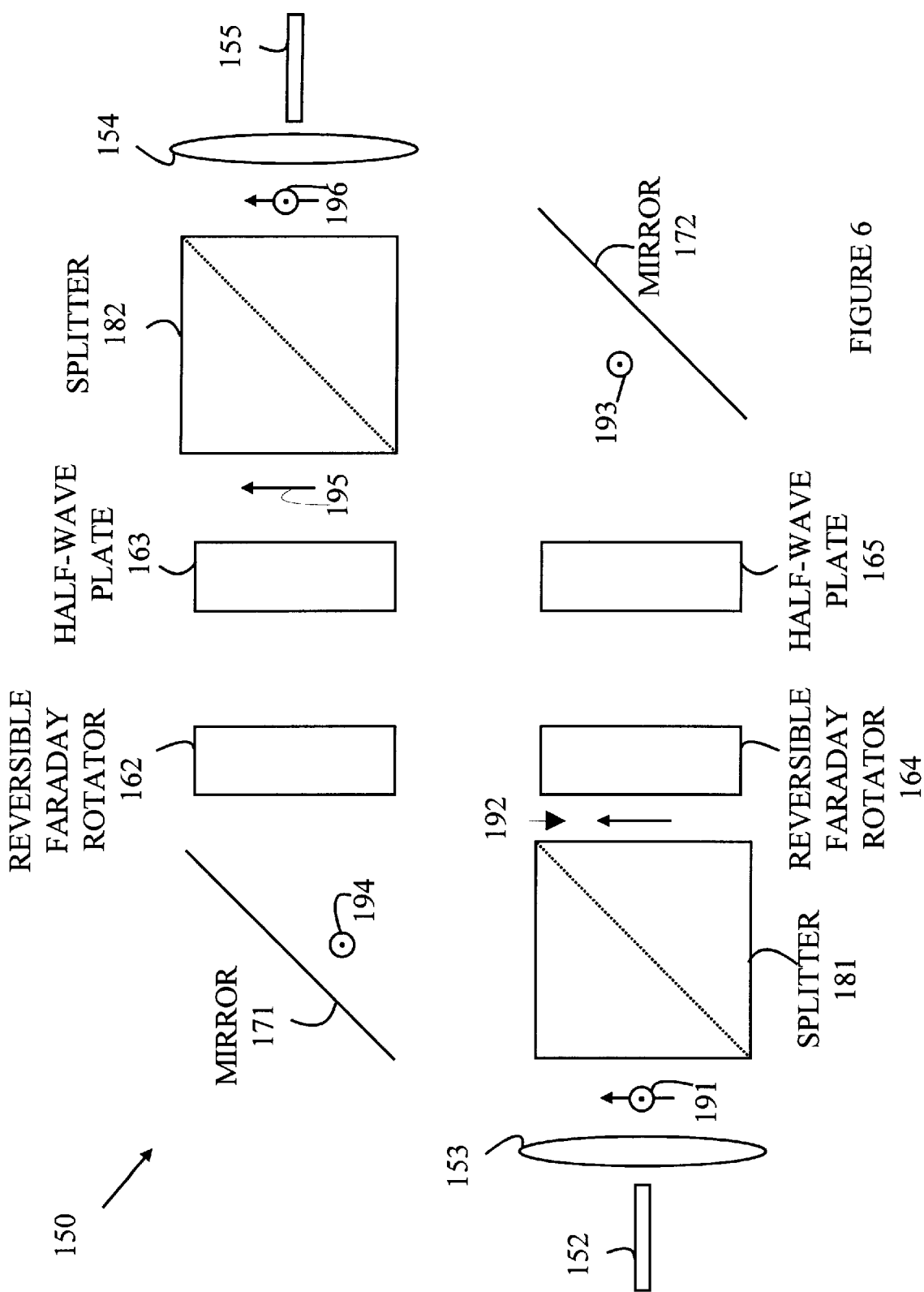
FIGS. 6 and 7 are cross-sectional views of another embodiment of a reversible optical isolator according to the present invention.

For optical isolator 100 to function, it is assumed that at least part of the light entering the isolator was aligned with the polarization filter at the input port. The remaining light is lost. Embodiments which do not have this constraint and which pass essentially all of the light may also be constructed from Faraday rotators having magnetic fields that can be switched. Refer now to FIG. 6 which is a schematic view of a reversible isolator 150 according to the present invention which accepts light on any polarization and passes the light without losses other than those associated with absorption in the optical components. Isolator 150 utilizes two non-reciprocal polarization rotators to accomplish the isolation. Each non-reciprocal polarization rotator consists of a reversible Faraday rotator in series with a halfwave plate. The direction of rotation of the polarization vector provided by the Faraday rotator is the same regardless of the direction of travel of the light therethrough. The half-wave plate, in contrast, provides either a 45° or −45° rotation depending on the direction of travel of the light. As a result, in one direction the polarization vector is rotated through 90°, and in the other, it is rotated through 0°.

Consider the case in which the reversible Faraday rotators 162 and 164 are set such that isolator 150 passes light from port 152 to port 155. Light entering port 152 is collimated by lens 153. A polarization beam splitter 181 decomposes the polarization vector 191 of the incoming light into orthogonal components shown at 192 and 194. The polarization beam splitters are constructed from prisms that selectively reflect light of a predetermined polarization while passing light of the orthogonal polarization. The polarization component reflected by splitter 181 is reflected by mirror 171 into reversible Faraday rotator 162, which rotates the polarization by 45°. Half-wave plate 163 rotates the polarization vector by another 45° as shown at 195. This polarization passes through polarization splitter 182.

The component of the input light that passed through splitter 181 is shown at 192. This component is likewise rotated through a total of 90° by reversible Faraday rotator 164 and half-wave plate 165. The output of half-wave plate 165 is reflected into splitter 182 by mirror 172. This polarization is reflected by splitter 182 into lens 154 where it is combined with the output of half-wave plate 163 discussed above to reconstitute the input light as shown at 196.

Figure 7:
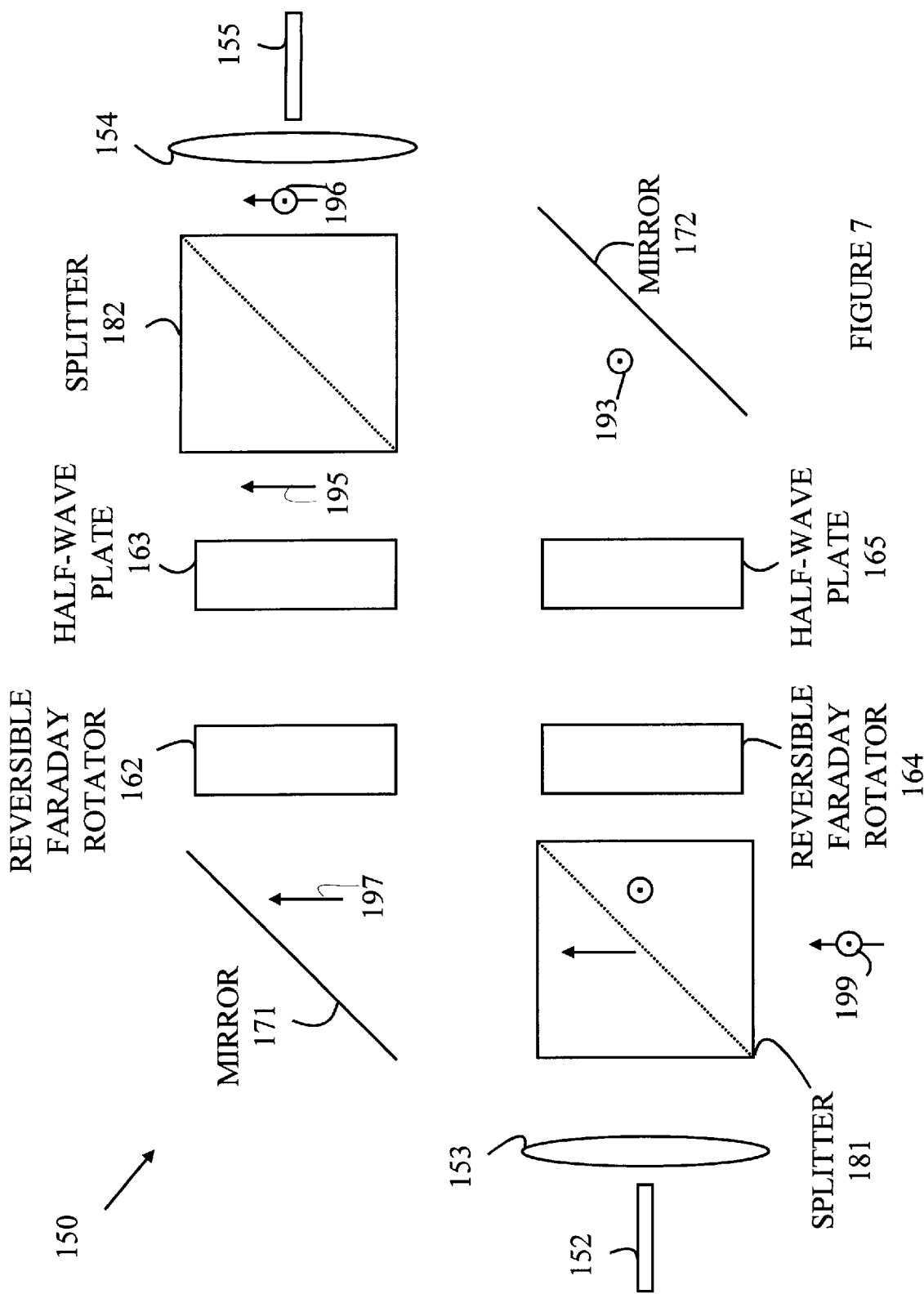

Refer now to FIG. 7, which illustrates the manner in which light entering port 155 is blocked from exiting via port 152 by beam splitter 181. The combination of half-wave plate 163 and Faraday rotator 162 leaves the polarization vector unchanged for this direction of travel. Hence, the component of the polarization that is passed by splitter 182 leaves reversible Faraday rotator 162 with the same polarization as shown 197. This component is reflected by mirror 171 into splitter 181 and passes through splitter 181. The component of the input light reflected by splitter 182 and mirror 172 passes unchanged through half-wave plate 165 and reversible Faraday rotator 164 since Faraday rotator 164 reverses the 45° rotation introduced by half-wave plate 165. This component is reflected by splitter 181 and is recombined with component 197. The reconstituted light then leaves via the bottom of splitter 181 as shown at 199, and hence, misses lens 153.

If the magnetic fields in the reversible Faraday rotators are reversed, light entering port 155 will exit port 152 since the combination of the Faraday rotator's −45° and the half-wave plate −45° will rotate the polarization vectors through 90°. Light with the resultant polarization will be reflected by beam splitter 181 such that these polarization components are combined and exit via lens 153. Similarly, light entering port 152 will be blocked from leaving via port 155, because the combination of the −45° rotation provided by the Faraday rotators and the 45° provided by the half-wave plates cancel resulting in the combined light exiting via the top of splitter 182, and hence, missing lens 154.

It will be apparent from the above discussion that the combination of the half-wave plates and the polarization beam splitters perform the same polarization filtering function as polarization filters 104 and 105 shown in FIG. 5. Accordingly, a reversible isolator may be viewed as a being constructed from a reversible Faraday rotator and two polarization filters, one for setting the polarization of the light incident on the Faraday rotator and one for blocking light of a predetermined polarization leaving the Faraday rotator.

Figure 8:
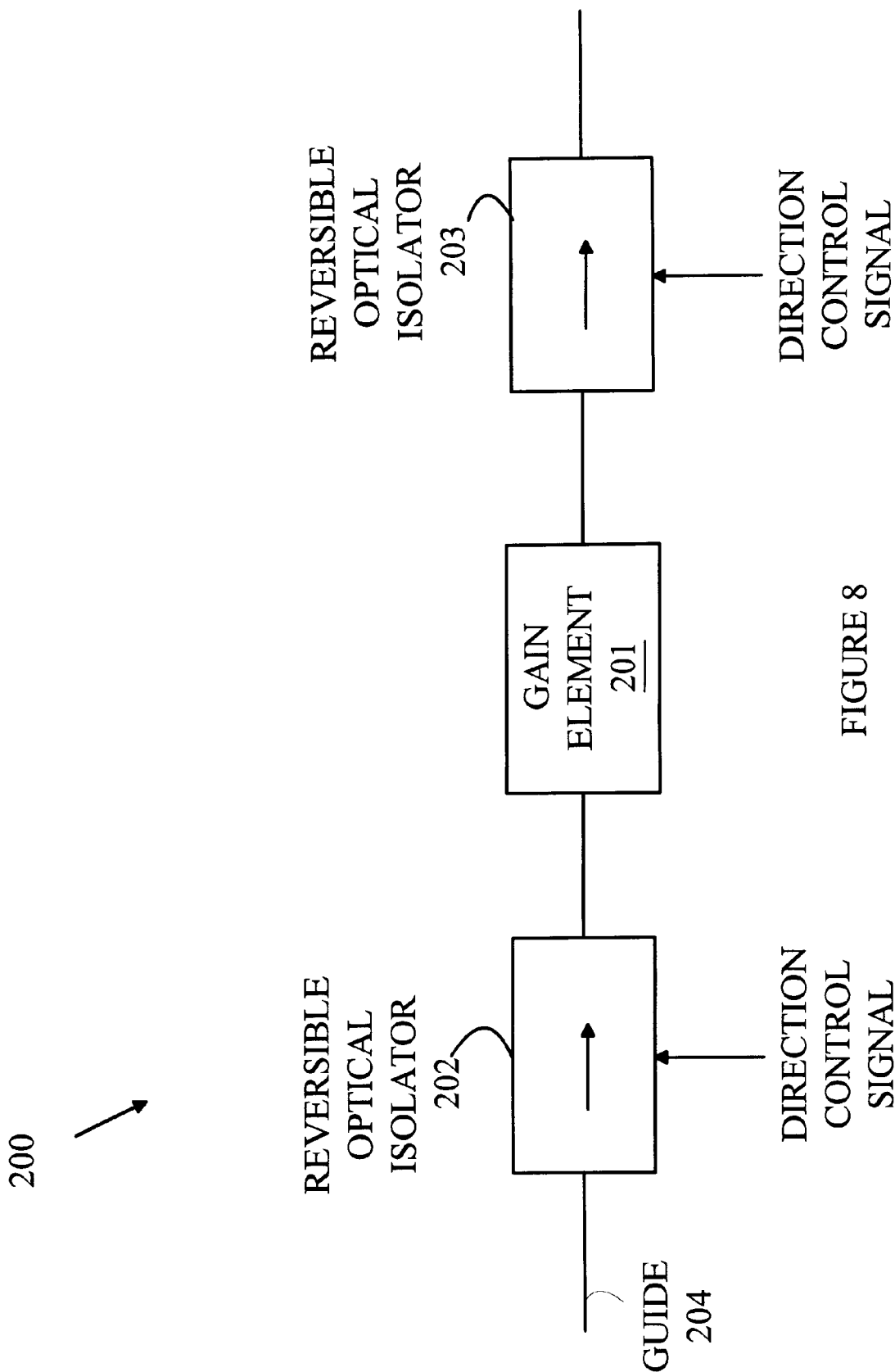
FIG. 8 is a schematic drawing of an optical amplifier according to the present invention.

Refer now to FIG. 8, which is a schematic view of an optical amplifier 200 according to the present invention. Amplifier 200 includes a gain element 201, which is isolated by reversible optical isolators 202 and 203 from other components on optical guide 204. The direction of propagation of the light through amplifier 200 is selected by applying a signal to the reversible isolators, which determines the direction of propagation through each of the isolators. It will be apparent that the direction of propagation must be the same for both isolators. The gain element is preferably an $Er^{3+}$-doped fiber; however other gain elements may be utilized. It should be noted that optical amplifier 200 will function with only one of the optical isolators; however, the resulting amplifier may be subject to additional noise.

The above embodiments of the present invention have utilized polarization beam splitters that operate by reflecting light of one polarization while transmitting light of the orthogonal polarization. However, it will be obvious to those skilled in the art from the preceding discussion that other types of beam splitters may be utilized. For example, beam splitters based on "walk-off" crystals in which light components having different polarizations are separated in space by passing the light through a rutile crystal may also be utilized. Accordingly, the term beam splitter as used herein is defined to include any apparatus that separates a beam into two components having orthogonal polarizations.

Various modifications to the present invention will become apparent to those skilled in the art from the foregoing description and accompanying drawings. Accordingly, the present invention is to be limited solely by the scope of the following claims.

What is claimed is:

1. A reversible optical isolator comprising:
a first polarization filter;
a Faraday rotator having a magnetic field direction determined by a control signal received by said Faraday rotator; and
a second polarization filter, wherein said first polarization filter comprises a polarization beam splitter for splitting light incident thereon into two light beams having orthogonal polarizations.

2. The optical isolator of claim 1 wherein said second polarization comprises a half-wave plate and a polarization beam splitter for splitting light incident thereon into two light beams having orthogonal polarizations.

3. An optical amplifier comprising:
an optical guide for receiving light to be amplified;
a gain element connected to said optical guide for amplifying light passing therethrough; and
a first optical isolator coupled to said gain element for preventing light from propagating in a direction determined by a control signal applied to said first optical isolator, said first optical isolator comprising a first polarization filter; a Faraday rotator having a magnetic field direction determined by a control signal received by said Faraday rotator; and a second polarization filter.

4. The optical amplifier of claim 3 further comprising a second optical isolator coupled to said gain element for preventing light from propagating in a direction determined by said control signal, said gain element being sandwiched between said first and second optical isolators.

\* \* \* \* \*